(12) United States Patent
Yamada et al.

(10) Patent No.: US 8,179,588 B2
(45) Date of Patent: May 15, 2012

(54) SWITCHABLE MIRROR ELEMENT, AND SWITCHABLE MIRROR COMPONENT AND INSULATING GLASS EACH INCORPORATING THE SWITCHABLE MIRROR ELEMENT

(75) Inventors: Yasusei Yamada, Nagoya (JP); Kazuki Yoshimura, Nagoya (JP); Shanhu Bao, Nagoya (JP); Kazuki Tajima, Nagoya (JP); Michiru Sakamoto, Nagoya (JP); Hidetoshi Ueno, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 363 days.

(21) Appl. No.: 12/536,565

(22) Filed: Aug. 6, 2009

(65) Prior Publication Data

US 2010/0039692 A1  Feb. 18, 2010

(30) Foreign Application Priority Data

Aug. 12, 2008 (JP) ................................. 2008-207915
May 20, 2009 (JP) ................................. 2009-121889

(51) Int. Cl.
*G02F 1/153* (2006.01)

(52) U.S. Cl. ........................................ 359/275; 359/265

(58) Field of Classification Search .................. 359/265, 359/270, 273, 275
See application file for complete search history.

(56) References Cited

U.S. PATENT DOCUMENTS 6,647,166 B2  11/2003  Richardson

FOREIGN PATENT DOCUMENTS

| JP | 3968432 | 6/2007 |
|---|---|---|
| JP | 2008-152070 | 7/2008 |

OTHER PUBLICATIONS

Patent Abstracts of Japan of JP 3968432 dated Jun. 15, 2007.
Patent Abstracts of Japan of JP 2008-152070 dated Jul. 3, 2008.
Huiberts, J. N., et al. "Yttrium and lanthanum hydride films with switchable optical properties." *Nature* (1996) vol. 380, pp. 231-234.
Yamada, Y., et al. "Optical properties of switchable mirrors based on magnesium-calcium alloy thin films." *Applied Physics Letters* (2009) vol. 94, pp. 191910-1 / 191910-3.

*Primary Examiner* — Jack Dinh
(74) *Attorney, Agent, or Firm* — Ladas & Parry LLP

(57) ABSTRACT

A switchable mirror element includes a switchable layer having a chromic property enabling the switchable layer to be reversibly changed from a transparent state by hydrogenation and a mirror state by dehydrogenation, and a catalytic layer disposed on the switchable layer and configured to promote hydrogenation or dehydrogenation in the switchable layer. The switchable layer includes an alloy of one or more metals from calcium, strontium, and barium, and magnesium.

15 Claims, 20 Drawing Sheets

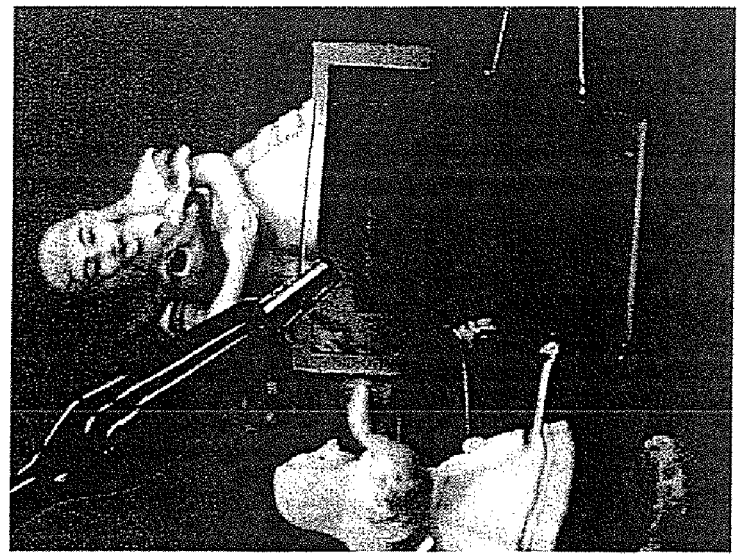
FIG. 24B  TRANSPARENT STATE
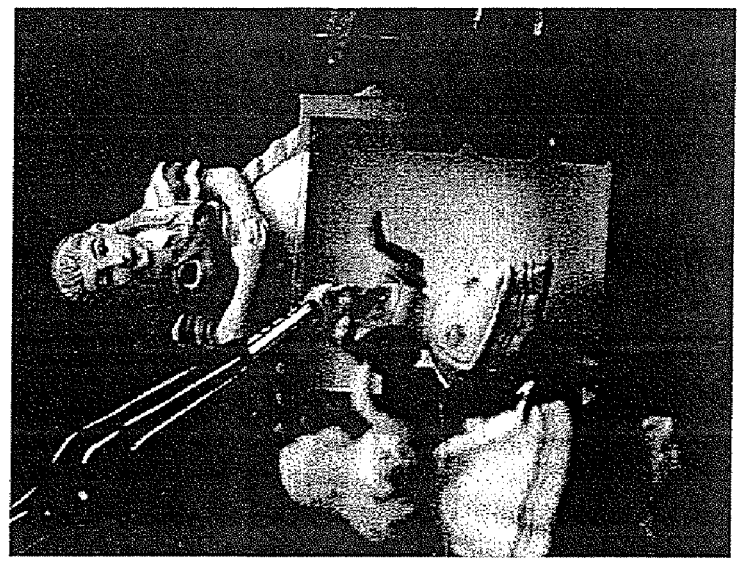
FIG. 24A  MIRROR STATE

SWITCHABLE MIRROR ELEMENT, AND SWITCHABLE MIRROR COMPONENT AND INSULATING GLASS EACH INCORPORATING THE SWITCHABLE MIRROR ELEMENT

BACKGROUND OF THE INVENTION

1. Field of the Invention

The present invention generally relates to a reflective light control (switchable mirror) element having a switchable layer, a switchable mirror component having the switchable mirror element, and an insulating glass having the switchable mirror element.

2. Description of the Related Art

Windows of a building provide large areas through which heat can enter or exit the building. A study suggests that about half of the heating energy that is lost from a typical house in winter exits via windows of the house, and as much as 70% of the heat that enters the house that is air-conditioned during summer comes through the windows. Thus, very large energy savings can be expected by properly controlling the passage of light and heat through the windows.

A switchable glass has been developed for this purpose, i.e., to control the entry and exit of light and heat. The material for the switchable glass may be categorized into several types depending on the way in which the glass controls light. They are 1) electrochromic material, in which optical transmittance can be changed reversibly by the application of a current or voltage; 2) thermochromic material, in which optical transmittance can be changed depending on temperature; and 3) gasochromic material, in which optical transmittance can be changed by controlling an atmosphere gas. Most advanced among those in terms of research and development is the electrochromic material. An electrochromic switchable glass with a switchable layer including a thin film of tungsten oxide has already reached practical application stage, and some commercial products are available.

In the electrochromic switchable glass in which a tungsten oxide thin-film is used, the switchable layer controls light by absorbing light. As a result, the switchable layer is heated as it absorbs light, and the heat is radiated back into the room or space fitted with the glass, thereby reducing the total energy saving effect. To overcome this problem, the entry or exit of light should desirably be controlled by reflecting light, rather than by absorbing it. Thus, a need had long been felt for material having properties such that it can reversibly switch between a transparent state and a mirror state.

Such material had not been found for a long time until 1996 when a Dutch group discovered that a transparent state and a mirror state can be reversibly switched by hydrogenating and dehydrogenating a rare-earth metal such as yttrium or lanthanum. A mirror using such material was named "switchable mirror" (see e.g., J. N. Huiberts, R. Griessen, J. H. Rector, R. J. Wijngaarden, J. P. Dekker, D. G. de Groot, and N. J. Koeman, "Yttrium and lanthanum hydride films with switchable optical properties", Nature, Vol. 380, 231 (1996)). Such hydrogenation and dehydrogenation of rare-earth metals can produce large changes in optical transmittance, and provide excellent switchable mirror properties. However, because such a switchable mirror requires rare-earth metals, problems concerning resources and cost have been encountered when used for coating a window or the like.

Materials known to exhibit the reflective light control properties (hereafter referred to as "switchable mirror properties") include rare-earth metals such as yttrium and lanthanum, alloys of a rare-earth metal such as gadolinium and magnesium, and alloys of magnesium and a transition metal (see, e.g., U.S. Pat. No. 6,647,166). Among those materials, an alloy of magnesium and a transition metal is suitable for coating a window glass from the viewpoint of resources and cost. Particularly, a magnesium-nickel alloy has been reported to provide high optical transmittance in the transparent state (see, e.g., JP Patent No. 3968432). However, these known materials are not completely colorless and transparent in the transparent state, but have a yellow to brown tint in varying degrees, posing a potential problem in application for window glasses. In order to overcome this problem of tint, a switchable mirror element using a magnesium-titanium alloy has been developed (see, e.g., Japanese Laid-Open Patent Application No. 2008-152070).

However, the conventional switchable mirror element using a magnesium-titanium alloy has a lower optical transmittance in the transparent state than a switchable mirror element that uses a magnesium-nickel alloy.

SUMMARY OF THE INVENTION

It is a general object of the present invention to provide a switchable mirror element in which one or more of the disadvantages of the related art are eliminated.

A more specific object is to provide a switchable mirror element that can be switched to a transparent state that is nearly completely colorless and provides a high optical transmittance. Another object of the present invention is to provide a switchable mirror component and an insulating glass each using the switchable mirror element.

According to one aspect of the present invention, a switchable mirror element includes a switchable layer having a chromic property enabling the switchable layer to be reversibly changed between a transparent state by hydrogenation and a mirror state by dehydrogenation; and a catalytic layer disposed on the switchable layer and configured to promote hydrogenation or dehydrogenation in the switchable layer. The switchable layer includes an alloy of one or more metals from calcium, strontium, and barium, and magnesium.

According to another aspect, a switchable mirror component includes the above switchable mirror element, and a transparent member disposed on the switchable layer on an opposite side to the catalytic layer.

According to another aspect, an insulating glass includes two glass plates, and the above switchable mirror element disposed on an inner surface of one of the two glass plates.

According to yet another aspect, an insulating glass includes two glass plates, and the above switchable mirror element disposed between the two glass plates, wherein an electrolyte is hermetically contained between the catalityc layer and a transparent electrode.

BRIEF DESCRIPTION OF THE DRAWINGS

Other objects, features and advantages of the present invention will become apparent upon consideration of the specification and the appendant drawings, in which:

FIG. 24A shows a photograph of the insulating glass of Example 35 in the mirror state; and;

FIG. 24B shows a photograph of the insulating glass of Example 35 in the transparent state.

DETAILED DESCRIPTION OF THE PREFERRED EMBODIMENTS

Figure 1:
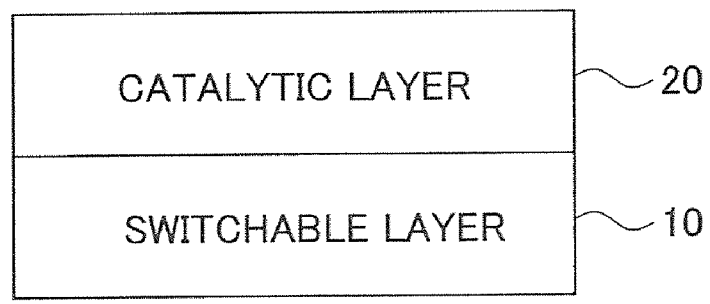
FIG. 1 shows a cross section of a switchable mirror element according to a first embodiment of the present invention.

Referring now to the drawings, wherein like reference numerals designate identical or corresponding parts throughout the several views, embodiments of the present invention are described. It will be appreciated that the present invention is not limited by any of the following embodiments or examples, and various modifications or variations will occur to those skilled in the art without departing from the scope of the invention Embodiment 1

FIG. 1 shows a cross section of a switchable mirror element according to a first embodiment of the present invention. The switchable mirror element includes a switchable layer 10 and a catalytic layer 20.

The switchable layer 10 has chromic properties so that the switchable layer 10 can be reversibly switched between the transparent state by hydrogenation and the mirror state (metal state) by dehydrogenation. Namely, the switchable layer 10 has an optical transmittance adjusting function. The switchable layer 10 characteristically comprises an alloy of one or more kinds of alkaline earth metal selected from calcium, strontium, and barium, and magnesium.

Such alloys turn into a colorless, transparent state by storing hydrogen, and into a silver-colored mirror state by releasing hydrogen. Among those alloys, a magnesium-calcium alloy is known as a fire-retardant material, and it exists more stably in the atmosphere than magnesium-titanium and magnesium-nickel alloys. The switchable layer 10 may contain trace amounts of elements other than magnesium, calcium, strontium, and barium as an inevitable component.

There are two methods of hydrogenating and dehydrogenating the switchable layer 10. In one method, which may be generally referred to as a gasochromic method, the switchable layer 10 is exposed to a hydrogen-containing gas for hydrogenation. For dehydrogenation, the switchable layer 10 is exposed to an oxygen-containing gas (air). In a second method, which may be generally referred to as an electrochromic method, an electrolyte is used for hydrogenation or dehydrogenation of the switchable layer 10.

The chromic properties of the switchable layer 10 depends on the composition of the switchable layer 10. As will be described in greater detail later, when the switchable layer 10 comprises a magnesium-calcium alloy, a preferable composition is $Mg_{1-x}Ca_x$ ($0.02<x<0.20$) and a more preferable composition is $Mg_{1-x}Ca_x$ ($0.03<x<0.09$). When x is 0.02 or less or 0.20 or more, sufficient optical transmittance in the transparent state cannot be obtained.

When the switchable layer 10 comprises a magnesium-strontium alloy, a preferable composition is $Mg_{1-x}Sr_x$ ($0.02<x<0.50$) and a more preferable composition is $Mg_{1-x}Sr_x$ ($0.15<x<0.25$). When x is 0.02 or less or 0.50 or more, sufficient optical transmittance in the transparent state cannot be obtained. When the switchable layer 10 comprises a magnesium-barium alloy, a preferable composition is $Mg_{1-x}Ba_x$ ($0.02<x<0.80$) and a more preferable composition is $Mg_{1-x}Ba_x$ ($0.20<x<0.70$). When x is 0.02 or less or 0.80 or more, sufficient optical transmittance in the transparent state cannot be obtained.

The switchable layer 10 normally has a film thickness of 10 nm to 200 nm. When the thickness is less than 10 nm, sufficient optical reflectance in the mirror state cannot be obtained. When the thickness is more than 200 nm, sufficient optical transmittance cannot be obtained in the transparent state. The switchable layer 10 may be formed by a conventional method, such as sputtering, vacuum vapor deposition, electron beam evaporation, chemical vapor deposition (CVD), or plating.

The catalytic layer 20 is formed on top of the switchable layer 10 and provides the function of promoting hydrogenation or dehydrogenation in the switchable layer 10. The catalytic layer 20 thus ensures a sufficient speed of switching from the transparent state to the mirror state and vice versa. The catalytic layer 20 may comprise palladium, platinum, a palladium alloy, or a platinum alloy. Particularly, palladium may be suitably used as it has high hydrogen permeability.

The catalytic layer 20 normally has a film thickness of 1 nm to 10 nm. When the thickness is less than 1 nm, sufficient catalytic function cannot be exhibited, while thicknesses exceeding 10 nm provides no improvement in catalytic function with insufficient optical transmittance. The catalytic layer 20 may be formed by a conventional method, such as sputtering, vacuum vapor deposition, electron beam evaporation, chemical vapor deposition (CVD), or plating.

As will be described in greater detail later, when the aforementioned alloys are used in the switchable layer 10, the switchable mirror element can be turned into a more nearly colorless state in the transparent state than when a magnesium-nickel alloy is used, and can also exhibit a higher optical transmittance than when a magnesium-nickel alloy or a magnesium-titanium alloy is used. Thus, by using the aforementioned alloys in the switchable layer 10, a switchable mirror element can be provided that is nearly completely colorless in the transparent state and has a high optical transmittance.

Embodiment 2

Figure 2:
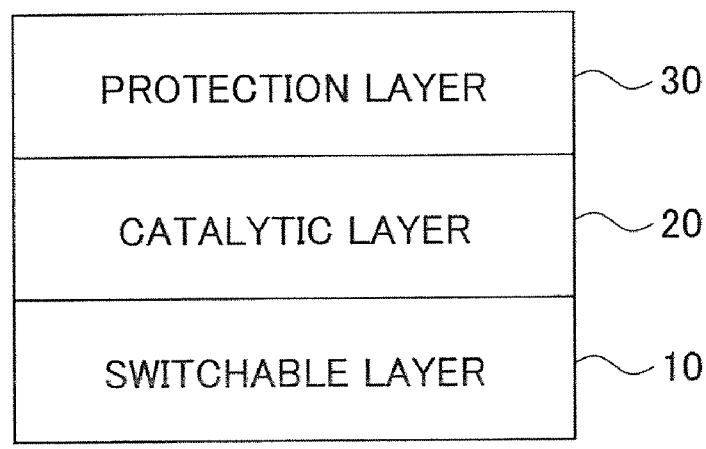
FIG. 2 shows a cross section of a switchable mirror element according to a second embodiment of the present invention.

FIG. 2 shows a cross section of a switchable mirror element according to a second embodiment of the present invention. The switchable mirror element includes a protection layer 30 in addition to the switchable layer 10 and the catalytic layer 20 of the first embodiment. Description of similar components or aspects to the first embodiment is omitted.

The protection layer 30 is formed on the catalytic layer 20 on the opposite side to the switchable layer 10. The protection layer 30 provides the function of preventing oxidation of the switchable layer 10 by water or oxygen, in cooperation with the catalytic layer 20. Although the catalytic layer 20 also functions to prevent oxidation of the switchable layer 10, the oxidation preventing function is not sufficient due to its film thickness. Thus, oxidation of the switchable layer 10 is also prevented by forming the protection layer 30.

The protection layer 30 is made of a material that is permeable to hydrogen (protons) and impermeable to water (water-repellent). For example, the protection layer 30 is made of a polymer material such as polyvinyl acetate, polyvinyl chloride, polystyrene, or acetylcellulose, or an inorganic thin film such as a titanium oxide thin-film. The protection layer 30 may be formed by a conventional method, such as application of a polymer dispersion, drying, or sputtering of inorganic matter.

Embodiment 3

Figure 3:
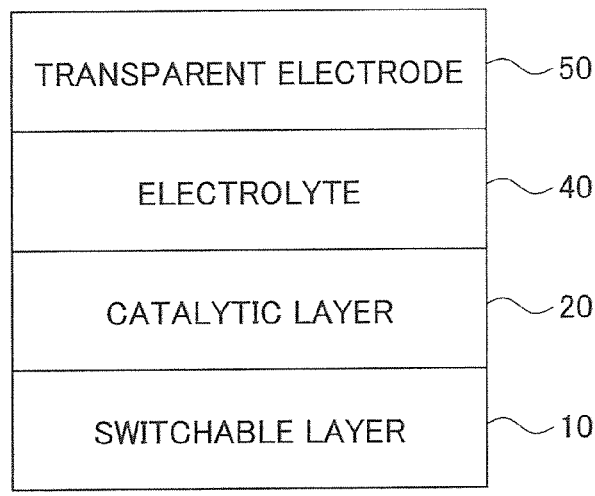
FIG. 3 shows a cross section of a switchable mirror element according to a third embodiment of the present invention.

FIG. 3 shows a cross section of a switchable mirror element according to a third embodiment of the present invention. The switchable mirror element includes an electrolyte 40 and a transparent electrode 50 in addition to the elements of the first embodiment. Description of the similar components or functions to the first embodiment is omitted.

The electrolyte 40 is hermetically contained between the catalytic layer 20 and the transparent electrode 50. When an electric field is caused to act on the electrolyte 40, protons (hydrogen ions) may be introduced into or released from the switchable layer 10. The electrolyte 40 may be made of a conventional material, such as aqueous sodium hydroxide.

The transparent electrode 50 has a function of causing an electric field to act on the electrolyte 40. The transparent electrode 50 may preferably comprise an ITO film.

Embodiment 4

Figure 4:
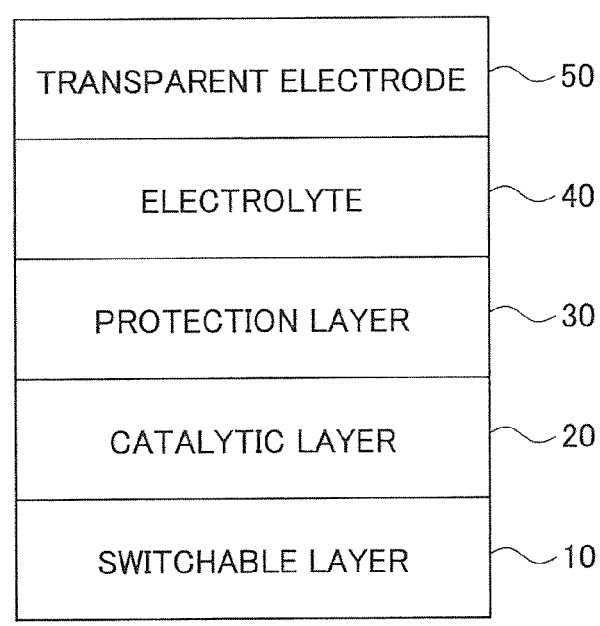
FIG. 4 shows a cross section of a switchable mirror element according to a fourth embodiment of the present invention.

FIG. 4 shows a cross section of a switchable mirror element according to a fourth embodiment. The switchable mirror element is similar to the third embodiment with the exception that a protection layer 30 is disposed between the catalytic layer 20 and the electrolyte 40, so that oxidation of the switchable layer 10 due to the electrolyte 40 can be prevented. Description of similar components or functions to the third embodiment is omitted.

Embodiments 5 and 6

Figure 5:
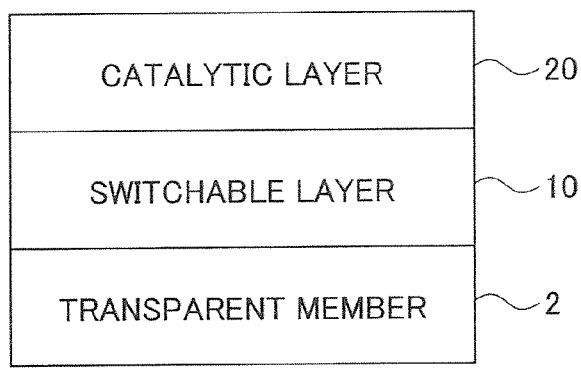
FIG. 5 shows a cross section of a switchable mirror component according to a fifth embodiment of the present invention.
Figure 6:
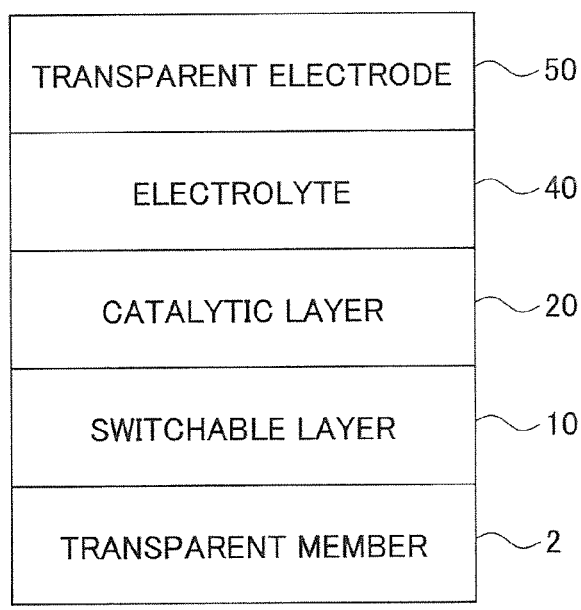
FIG. 6 shows a cross section of a switchable mirror component according to a sixth embodiment of the present invention.

FIGS. 5 and 6 show cross sections of switchable mirror components according to fifth and sixth embodiments, respectively. The switchable mirror components include the switchable mirror elements according to the first and the third embodiments, respectively, shown in FIGS. 1 and 3, respectively. In the fifth and the sixth embodiments, a transparent member (substrate) 2 is disposed on the switchable layer 10 on the opposite side to the catalytic layer 20. In another embodiment, the switchable mirror component may include the switchable mirror element shown in FIG. 2 or 4.

The transparent member 2 serves as a base for the switchable mirror element. Preferably, the transparent member 2 provides a function of preventing oxidation of the switchable layer 10 due to water or oxygen. The transparent member 2 may be in the form of a flexible sheet or film. The transparent member 2 may be made of glass or plastic material. Examples of the plastic material include polyethylene terephthalate (PET), polyethylene naphthalate (PEN), nylon, and acrylic.

These switchable mirror components having the light control function according to the embodiments of the present invention may be applied widely in various articles other than in the window glass for buildings and vehicles. For example, the switchable mirror component according to Embodiment 5 or 6 may be applied in privacy protecting shields, ornamental items, or toys.

Embodiment 7

Figure 7:
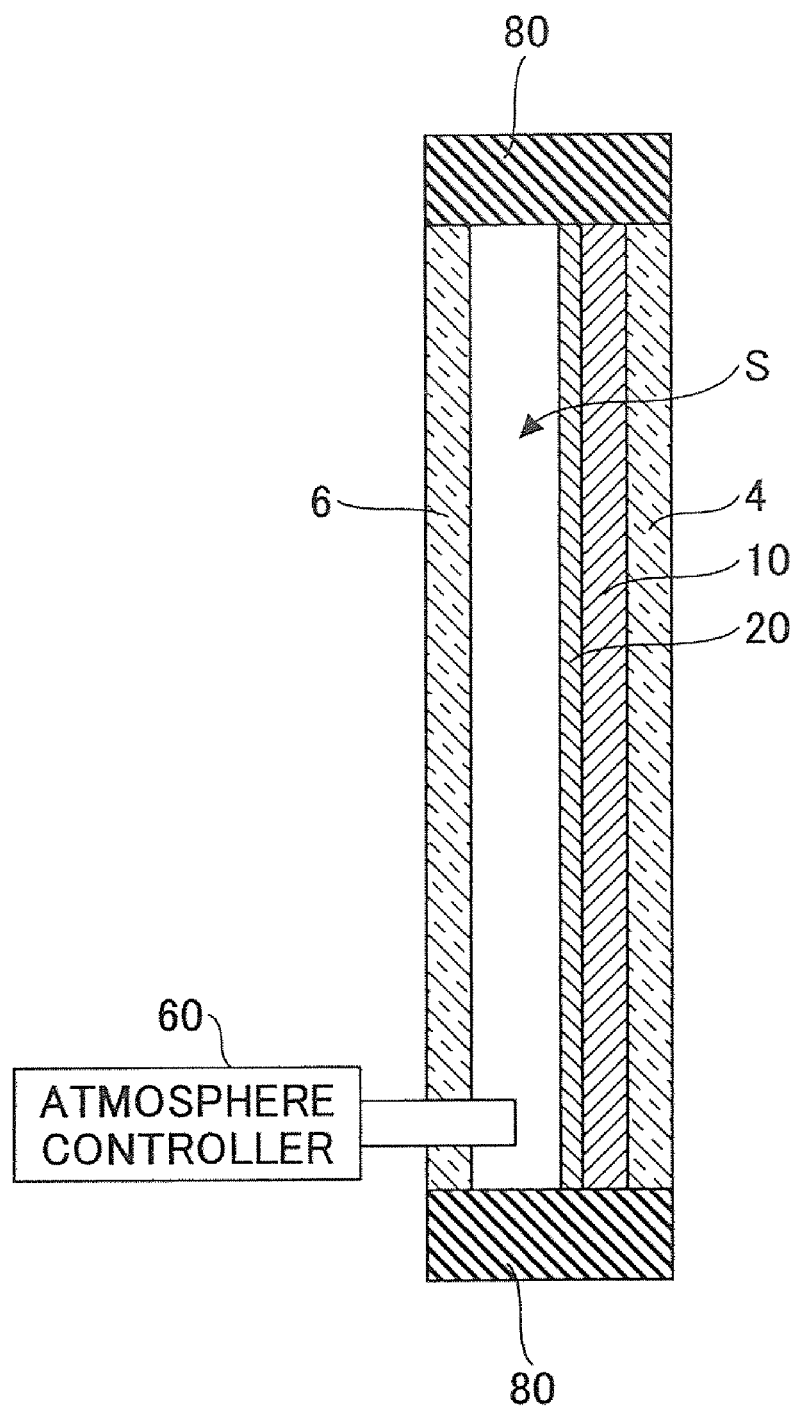
FIG. 7 shows a cross section of an insulating glass according to a seventh embodiment of the present invention.

FIG. 7 shows a cross section of an insulating glass according to a seventh embodiment of the present invention. The insulating glass includes two glass plates 4 and 6. On the inside of the glass plate 4, there is formed the switchable mirror element according to the first embodiment shown in FIG. 1. Specifically, on the inside of the glass plate 4, there are formed the switchable layer 10 and the catalytic layer 20. In another embodiment, the protection layer 30 may be formed on the catalytic layer 20 on the opposite side to the switchable layer 10, as shown in FIG. 2. In yet another embodiment, on the inside of each of the glass plates 4 and 6, there may be formed the switchable layer 10 and the catalytic layer 20.

As shown in FIG. 7, a gas-filled chamber S is formed between the two glass plates 4 and 6, with openings sealed with sealing members 80. The gas-filled chamber is filled with an argon gas in advance in a sealed manner. An atmosphere controller 60 is connected to the gas-filled chamber S to charge or discharge hydrogen, oxygen, or air into or from the gas-filled chamber S. For example, the atmosphere controller 60 supplies hydrogen or oxygen by electrolysis of water, and discharges the gas out of the gas-filled chamber S to the outside by using a vacuum pump.

When hydrogen is supplied to the gas-filled chamber S, the switchable layer 10 is hydrogenated via the catalytic layer 20, so that the switchable layer 10 turns into the transparent state. When oxygen or air is supplied to the gas-filled chamber S, the switchable layer 10 is dehydrogenated via the catalytic layer 20, so that the switchable layer 10 turns into the mirror state. Thus, by controlling the atmosphere in the gas-filled chamber S via the atmosphere controller 60, the transparent state and the mirror state can be reversibly controlled. Either state can be maintained by interrupting the supply or discharge of the gas. Thus, a gasochromically switchable insulating glass can be obtained.

Insulating glasses are gaining increasing popularity among homes, and more and more newly built houses are fitted with them. Thus, by fitting the switchable mirror element according to an embodiment of the present invention to the inside of an insulating glass, the internal space can be utilized as the gas-filled chamber S for switching.

Embodiment 8

Figure 8:
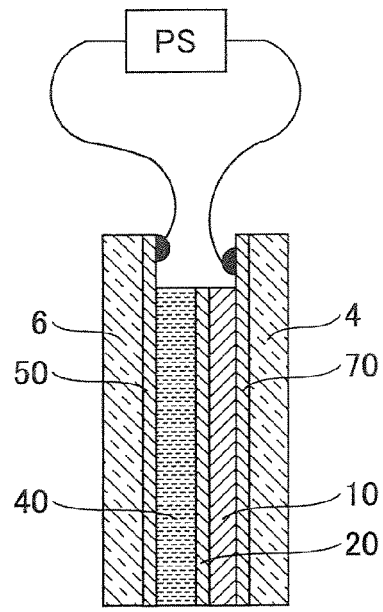
FIG. 8 shows a cross section of an insulating glass according to an eighth embodiment of the present invention.

FIG. 8 shows a cross section of an insulating glass according to an eighth embodiment of the present invention. The insulating glass includes two glass plates 4 and 6, with the switchable mirror element shown in FIG. 3 provided between them. Specifically, the insulating glass according to the present embodiment includes, successively, the glass plate 4, the first transparent electrode 70, the switchable layer 10, the catalytic layer 20, the electrolyte 40, the second transparent electrode 50, and the glass plate 6. Between the catalytic layer 20 and the electrolyte 40 of the insulating glass, there may be provided the protection layer 30.

In the insulating glass according to the eighth embodiment, the second transparent electrode 50 is grounded and a voltage of about minus 3V is applied to the first transparent electrode 70. This causes an electric field to act on the electrolyte 40, whereby protons in the electrolyte 40 are introduced into the switchable layer 10. As a result, the switchable layer 10 is hydrogenated and switched into the transparent state. On the other hand, when the second transparent electrode 50 is grounded and a voltage of about 1V is applied to the first transparent electrode 70, thereby reversing the electric field, the protons are released from the switchable layer 10, so that the switchable layer 10 is rendered back to the mirror state.

Thus, by controlling the voltage across the first transparent electrode 70 and the second transparent electrode 50, the transparent and mirror states can be reversibly controlled (switched). When the application of voltage is stopped, the introduction or releasing of the protons is interrupted, so that the instantaneous state can be maintained. Thus, an electrochromically switchable insulating glass can be obtained.

Embodiment 9

Figure 9:
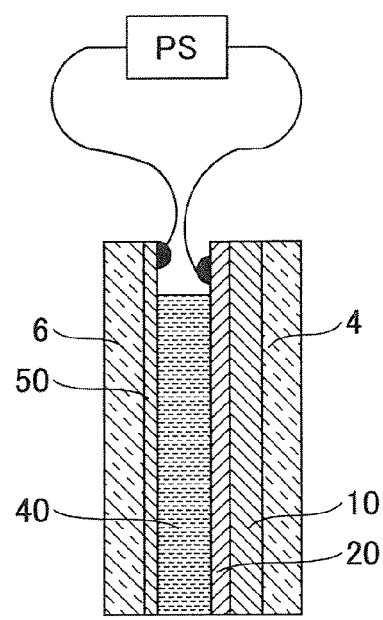
FIG. 9 shows a cross section of an insulating glass according to a ninth embodiment of the present invention.

FIG. 9 shows a cross section of an insulating glass according to a ninth embodiment of the present invention. The insulating glass according to the present embodiment includes the two glass plates 4 and 6 between which the switchable mirror element shown in FIG. 3 is disposed, as in the second embodiment. However, the ninth embodiment differs from the eighth embodiment in that it does not include the first transparent electrode 70 and instead a voltage is applied to the switchable layer 10.

The switchable layer 10 in the mirror state (metal state) naturally has a high electrical conductivity and functions as an electrode. Even in the transparent state, the switchable layer 10 exhibits some electrical conductivity, functioning as an electrode. Therefore, the insulating glass can be reversibly controlled (switched) between the transparent state and the mirror state in the absence of the first transparent electrode 70, by applying a voltage to the switchable layer 10 and thus controlling the voltage across the switchable layer 10 and the second transparent electrode 50.

In this case, the structure of the glass can be simplified by the absence of the first transparent electrode 70. Although the switching response is higher for the insulating glass having the first transparent electrode 70, the absence of the first transparent electrode 70 provides a higher optical transmittance in the transparent state.

EXAMPLE 1

The switchable mirror component shown in FIG. 5 was manufactured by successively forming, on a glass substrate (transparent member 2) with a thickness of 1 mm, a magnesium-calcium alloy thin film (switchable layer 10) with a thickness 48 nm, and a palladium thin film (catalytic layer 20) with a thickness 5 nm.

The magnesium-calcium alloy thin film and the palladium thin film were formed by using a magnetron sputtering system capable of multi-target film formation. Specifically, metallic magnesium, metallic calcium, and metallic palladium were set on three sputter guns respectively as individual targets. A glass substrate was washed and then set in a vacuum apparatus, and evacuation was performed. Film formation involved simultaneous sputtering of magnesium and calcium by a direct-current sputtering method, forming a magnesium-calcium alloy thin film. The argon gas pressure during sputtering was 1 Pa, and the power was 32 W for magnesium and 6 W for calcium. Thereafter, a palladium thin film was vapor-deposited under the same vacuum conditions with a power of 6 W. Analysis of the manufactured magnesium-calcium alloy thin film by Rutherford backscattering spectroscopy showed that the thin film had a composition $Mg_{1-x}Ca_x$ (x=0.059).

The switchable mirror component as manufactured had metal gloss and was in the mirror state. When the surface of the palladium thin film was exposed to one atmospheric pressure of hydrogen gas diluted with argon to 4 vol % (hereafter referred to as "hydrogen containing gas"), the mirror state switched to the transparent state by hydrogenation of the magnesium-calcium alloy thin film. The state was switched back to the original mirror state upon exposing of the surface of the palladium thin film to the atmosphere, due to dehydrogenation of the magnesium-calcium alloy thin film. Thus, the switchable mirror component according to Example 1 exhibited reversible changes in its state between the transparent state by hydrogenation and the mirror state by dehydrogenation.

The reflection and transmission spectra of the switchable mirror component according to Example 1 in the mirror and transparent states were measured. Each spectrum in the mirror state was measured by spectrophotometer immediately after manufacture of the switchable mirror component (in the mirror state), at room temperature. Each spectrum in the transparent state was measured by spectrophotometer at room temperature, following the measurement of the spectrum in the mirror state and after exposing the sample to a hydrogen containing gas at room temperature for five minutes. Measurement results are shown in FIG. 10.

Figure 10:
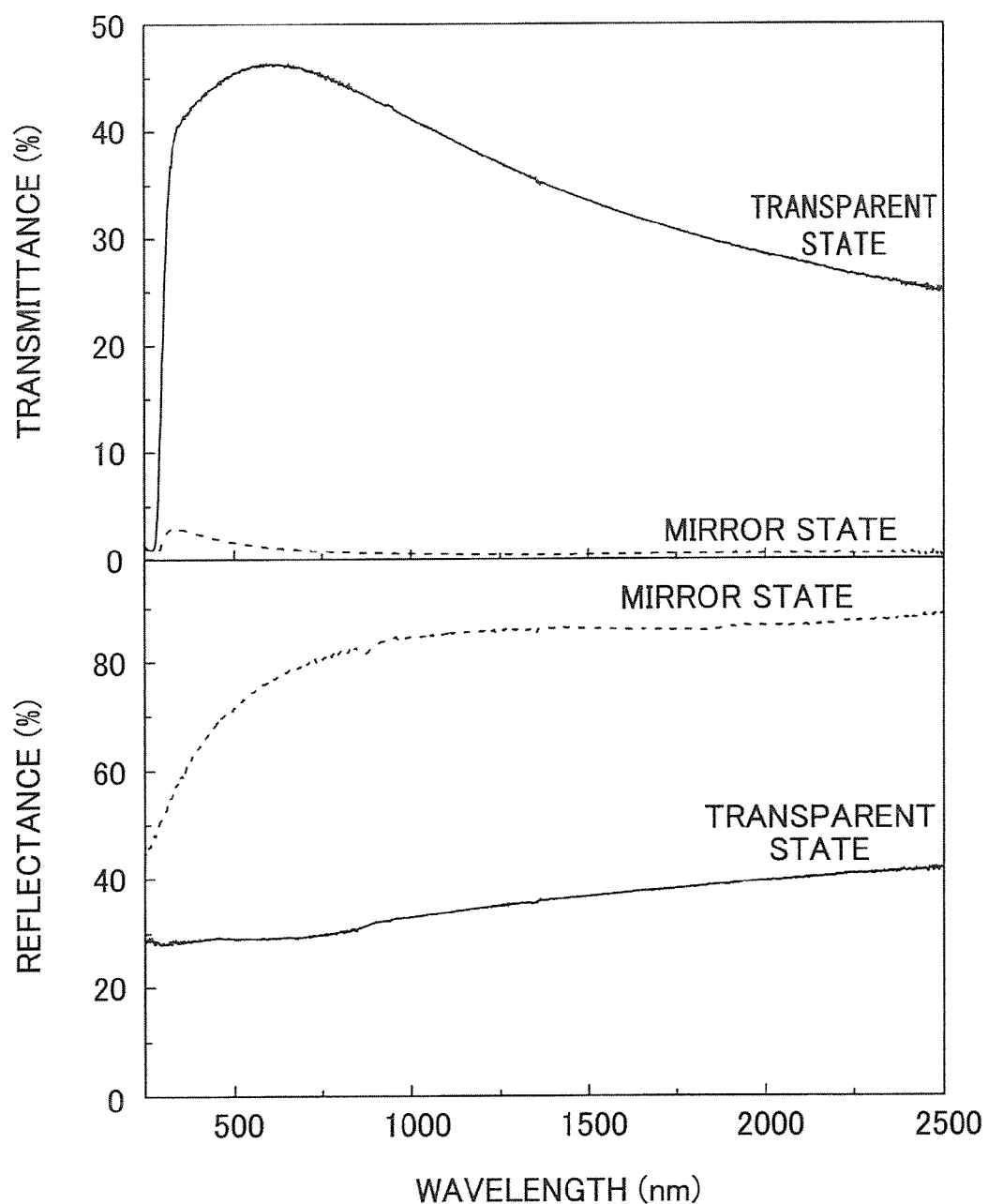
FIG. 10 shows reflection and transmission spectra of a switchable mirror component in the mirror and transparent states.

As will be seen from FIG. 10, in the switchable mirror component according to Example 1, reflectivity greatly changed between the transparent and mirror states, indicating the reflective chromic properties. Because the transmission and reflection spectra are flat in the transparent state, the transparent state is nearly colorless.

EXAMPLES 2 to 11

Switchable mirror components were manufactured in the same way as Example 1 with the exception that the power applied to metallic magnesium and calcium targets was varied when forming a magnesium-calcium alloy thin film so that the composition of the magnesium-calcium alloy thin film was varied. Analysis of the individual manufactured magnesium-calcium alloy thin films by Rutherford backscattering spectroscopy showed that the composition according to Examples 2 to 11 was $Mg_{1-x}Ca_x$ (x=0.021, 0.029, 0.036, 0.044, 0.053, 0.059, 0.068, 0.075, 0.117, and 0.184, respectively).

Figure 11:
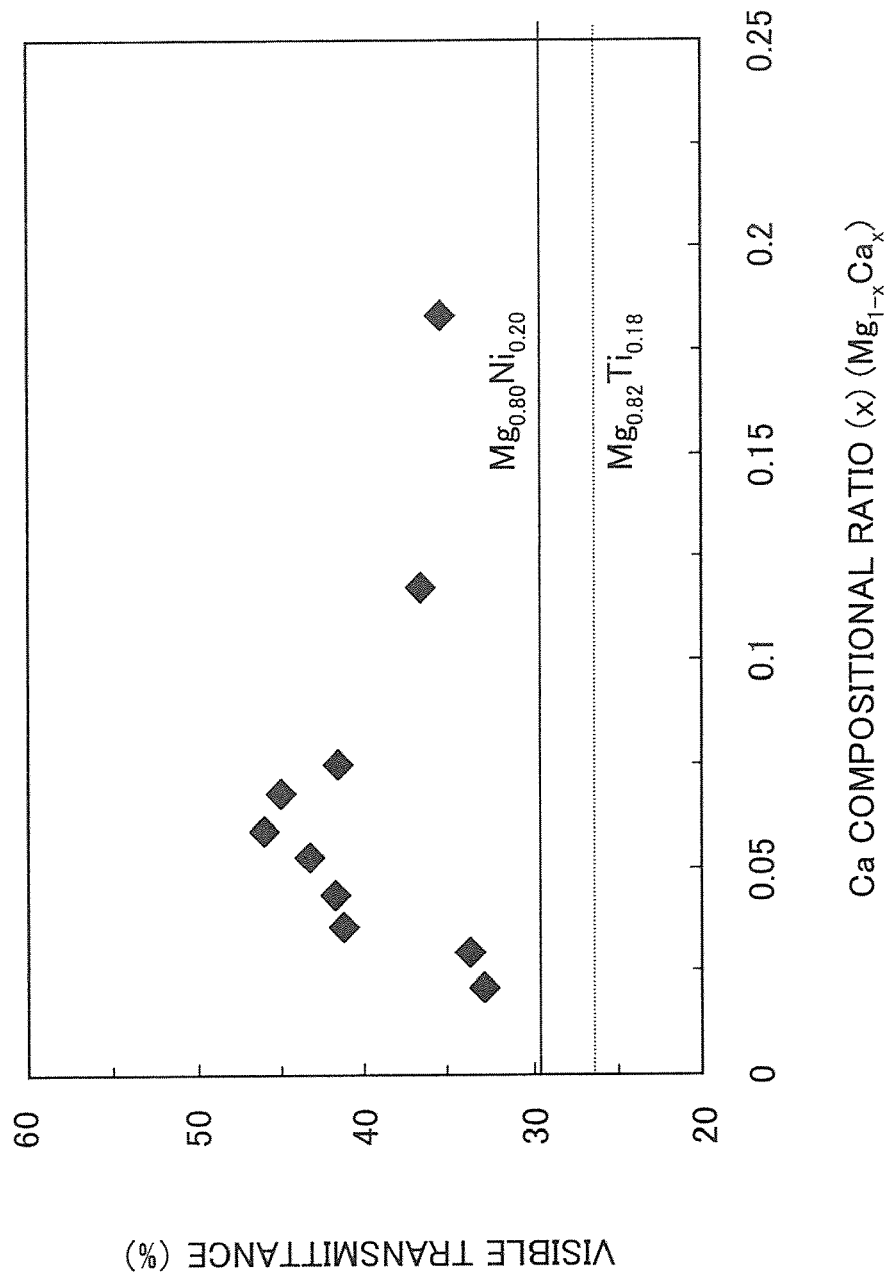
FIG. 11 shows a relationship between visible transmittance and the composition of a magnesium-calcium alloy thin film in a switchable mirror component in the transparent state.

Initially, the visible transmittance of the switchable mirror components according to Examples 2 to 11 in the transparent state was determined. The "visible transmittance" herein is intended to refer to the visible transmittance according to JIS (Japanese Industrial Standard) R3106. Specifically, the visible transmittance was calculated from the spectral transmittance that was measured by spectrophotometer in the same way as in Example 1. Measurement results are shown in FIG. 11. FIG. 11 also shows, for comparison purposes, the visible transmittance (solid line) of a switchable mirror component (hereafter referred to as "Comparative Example 1") manufactured in the same way as Example 1 and having a magnesium-nickel alloy thin film ($Mg_{0.8}Ni_{0.20}$) and a palladium thin film, and the visible transmittance (broken line) of a switchable mirror component (hereafter referred to as "Comparative Example 2") having a magnesium-titanium alloy thin film ($Mg_{0.082}Ti_{0.18}$) and a palladium thin film.

As will be seen from FIG. 11, the visible transmittance was dependent on the composition of the magnesium-calcium alloy thin film. Specifically, when the magnesium-calcium alloy thin film had the composition $Mg_{1-x}Ca_x$ ($0.02<x<0.20$), the visible transmittance was higher than when the magnesium-nickel alloy thin film (Comparative Example 1) or the magnesium-titanium alloy thin film (Comparative Example 2) was used. When the magnesium-calcium alloy thin film had the composition $Mg_{1-x}Ca_x$ ($0.02<x<0.09$), the visible transmittance was the highest.

Figure 12:
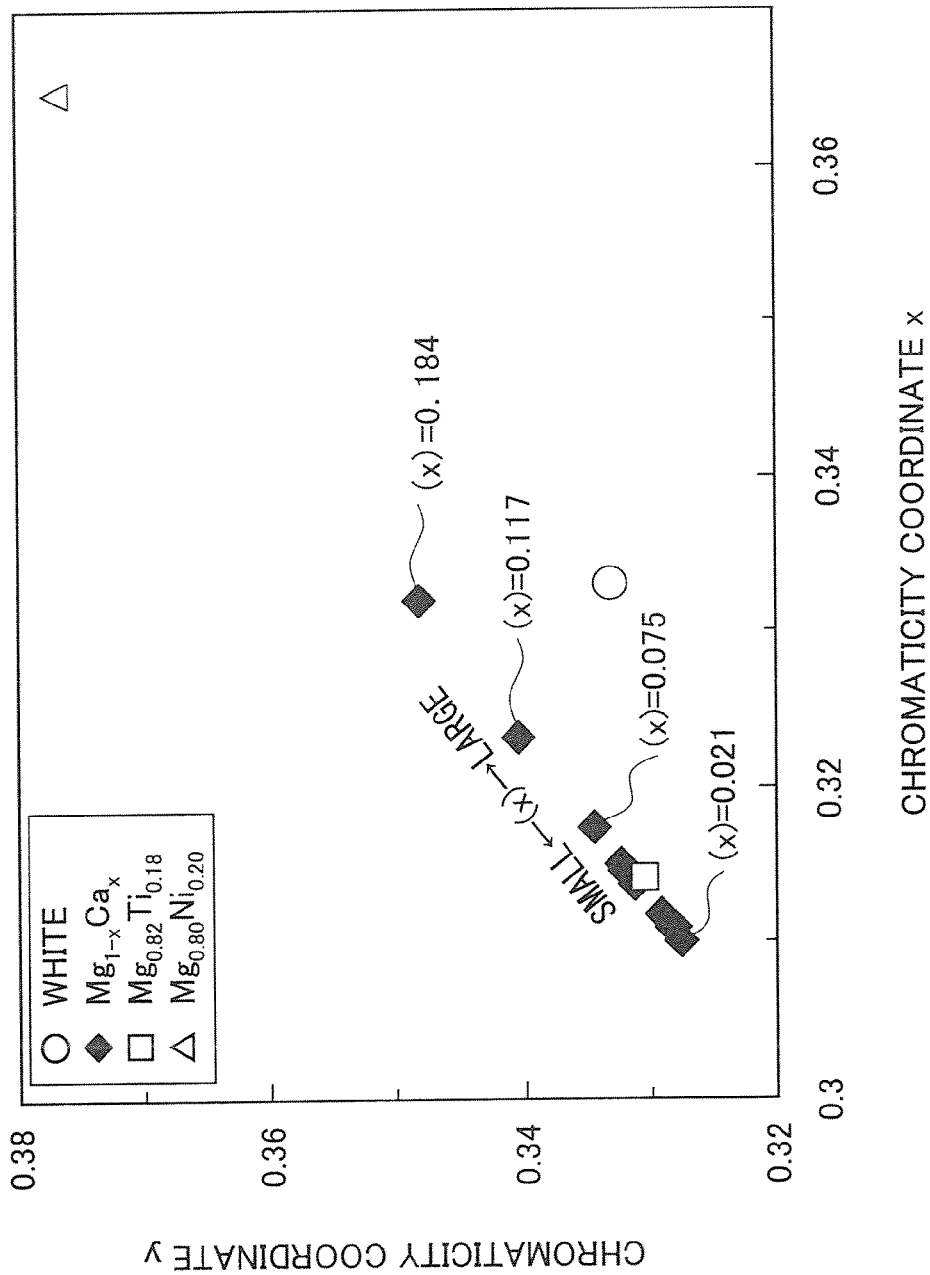
FIG. 12 shows a relationship between the chromaticity coordinates of transmitted light in an XYZ color system and the composition of a magnesium-calcium alloy thin film in a switchable mirror component in the transparent state.

Thereafter, the chromaticity of the transmitted light by the switchable mirror components according to Examples 2 to 11 in the transparent state was determined. As a light source, a D65 standard light source according to JIS Z8701 was used. Measurement results are shown in FIG. 12. FIG. 12 also shows, for comparison purposes, the chromaticity of transmitted light by Comparative Example 1, and the chromaticity of transmitted light by Comparative Example 2.

As will be seen from FIG. 12, the chromaticity coordinates of the transmitted light were dependent on the composition of the magnesium-calcium alloy thin film. When the magnesium-calcium alloy thin film had the composition $Mg_{1-x}Ca_x$ ($0.02<x<0.20$), the color of the transmitted light was white (colorless) or bluish white (cold color), which are not liable to make a user feel uncomfortable. On the other hand, when the magnesium-nickel alloy thin film was used (Comparative Example 1), the color of the transmitted light was yellow or brown, as reported in the aforementioned JP Patent No. 3968432, which are warm colors that tend to make a user feel uncomfortable. The color properties of the transmitted light were substantially the same as in the case of the magnesium-titanium alloy thin film (Comparative Example 2) when the composition of the magnesium-calcium alloy thin film was $Mg_{1-x}Ca_x$ ($0.02<x<0.13$).

EXAMPLES 12 to 20

Switchable mirror components were manufactured in the same way as Example 1 with the exception that a magnesium-strontium alloy thin film was formed instead of the magnesium-calcium alloy thin film as the switchable layer 10. Specifically, metallic strontium was set on the sputter gun as a target instead of metallic calcium. In Examples 12 to 20, the power applied to the metallic magnesium and strontium targets was varied so that the composition of the magnesium-strontium alloy thin film was varied. Analysis of the manufactured magnesium-strontium alloy thin films by Rutherford backscattering spectroscopy indicated that the composition according to Examples 12 to 20 was $Mg_{1-x}Sr_x$ (x=0.049, 0.070, 0.095, 0.095, 0.125, 0.144, 0.173, 0.201, and 0.239 respectively).

Figure 13:
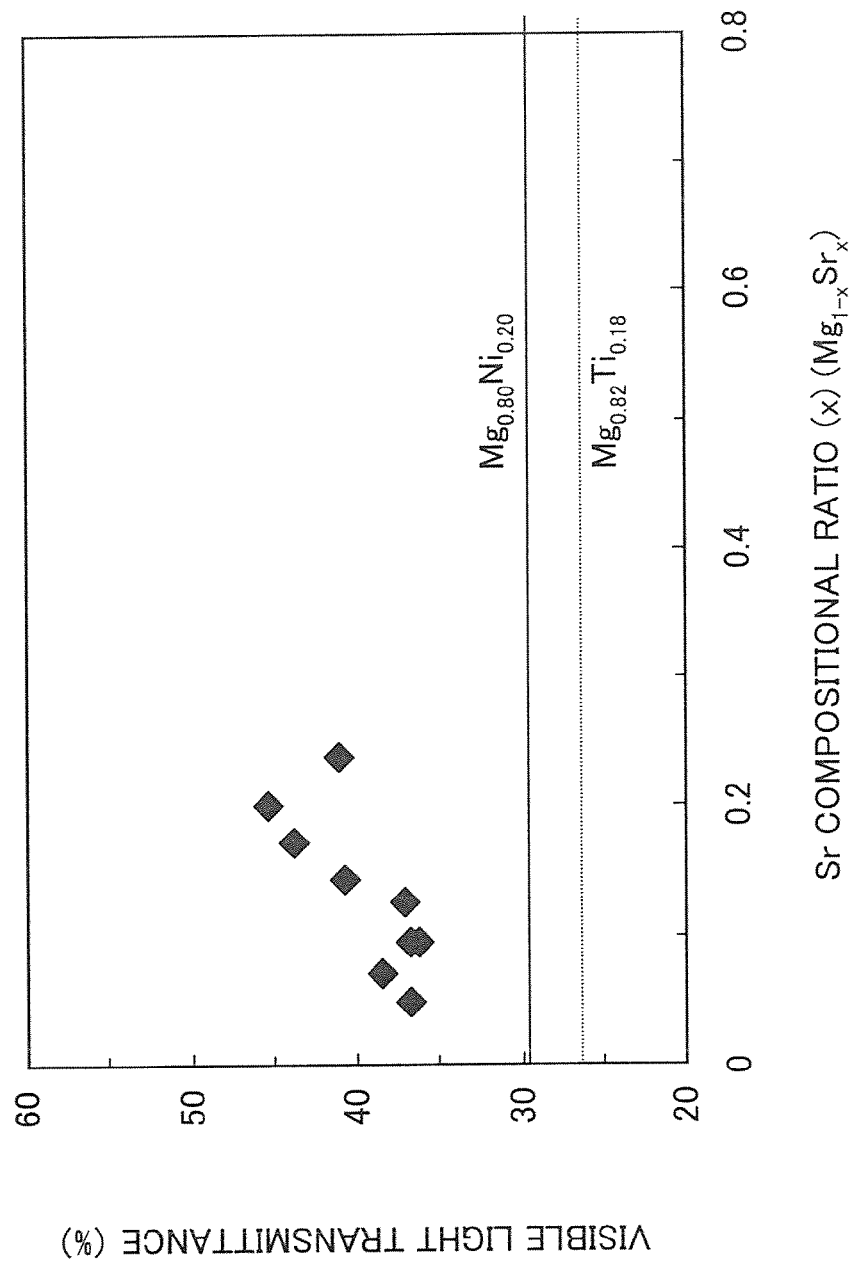
FIG. 13 shows a relationship between the visible transmittance of a switchable mirror component in the transparent state and the composition of a magnesium-strontium alloy thin film.

Initially, the visible transmittance of the switchable mirror component in Examples 12 to 20 in the transparent state was determined in the same way as in Example 2. The results are shown in FIG. 13. For comparison purposes, FIG. 13 also shows the visible transmittance (solid line) of Comparative Example 1, and the visible transmittance (broken line) of Comparative Example 2.

As will be seen from FIG. 13, the visible transmittance was dependent on the composition of the magnesium-strontium alloy thin film. When the magnesium-strontium alloy thin film had the composition $Mg_{1-x}Sr_x$ ($0.02<x<0.50$), the visible transmittance was higher than when the magnesium-nickel alloy thin film (Comparative Example 1) or the magnesium-titanium alloy thin film (Comparative Example 2) was used. When the magnesium-strontium alloy thin film had the composition $Mg_{1-x}Sr_x$ ($0.15<x<0.25$), the visible transmittance was the highest.

Thereafter, the chromaticity of the transmitted light of the switchable mirror components according to Examples 12 to 20 in the transparent state was determined in the same way as in Example 2. The results are shown in FIG. 14, which also shows, for comparison purposes, the chromaticity of the transmitted light of Comparative Example 1, and the chromaticity of the transmitted light of Comparative Example 2.

Figure 14:
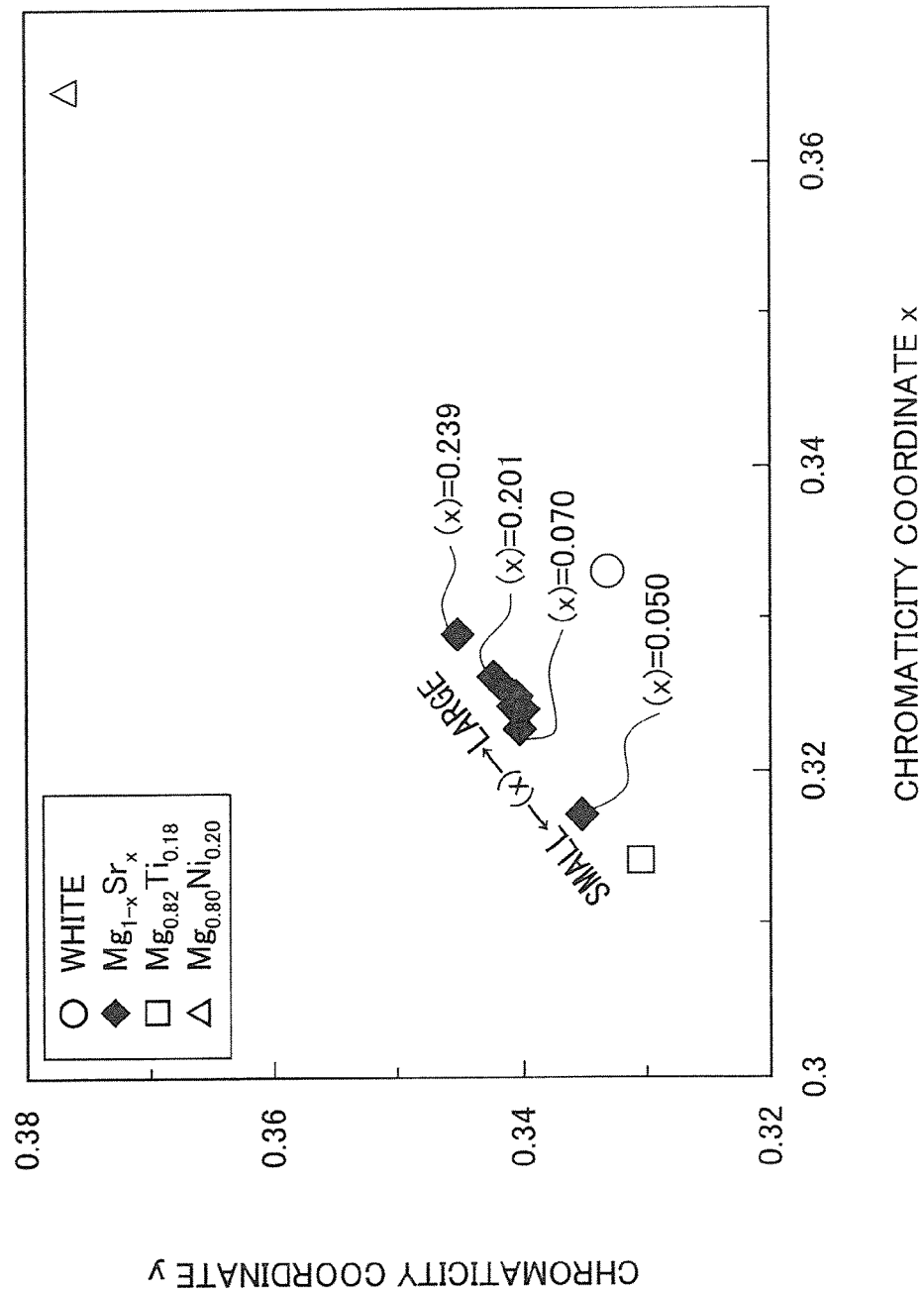
FIG. 14 shows a relationship between the chromaticity coordinates of transmitted light in a switchable mirror component in the transparent state in an XYZ color system and the composition of a magnesium-strontium alloy thin film.

As is seen from FIG. 14, the chromaticity coordinates of the transmitted light were dependent on the composition of the magnesium-strontium alloy thin film. When the magnesium-strontium alloy thin film had the composition $Mg_{1-x}Sr_x$ ($0.02<x<0.50$), the color of the transmitted light was white (colorless) or bluish white (cold color), which are not liable to make a user feel uncomfortable.

EXAMPLES 21 to 27

Switchable mirror components were manufactured in the same way as in Example 1 with the exception that a magnesium-barium alloy thin film was formed as the switchable layer 10 instead of a magnesium-calcium alloy thin film. Specifically, metallic barium was set on the sputter gun as a target instead of metallic calcium. In Examples 21 to 27, the power applied to the metallic magnesium and barium targets was varied so that the composition of the magnesium-barium alloy thin film was varied. Analysis of the manufactured magnesium-barium alloy thin films according to Examples 21 to 27 by Rutherford backscattering spectroscopy indicated the composition $Mg_{1-x}Ba_x$ (x=0.147, 0.221, 0.295, 0.328, 0.443, 0.550, and 0.739, respectively).

Figure 15:
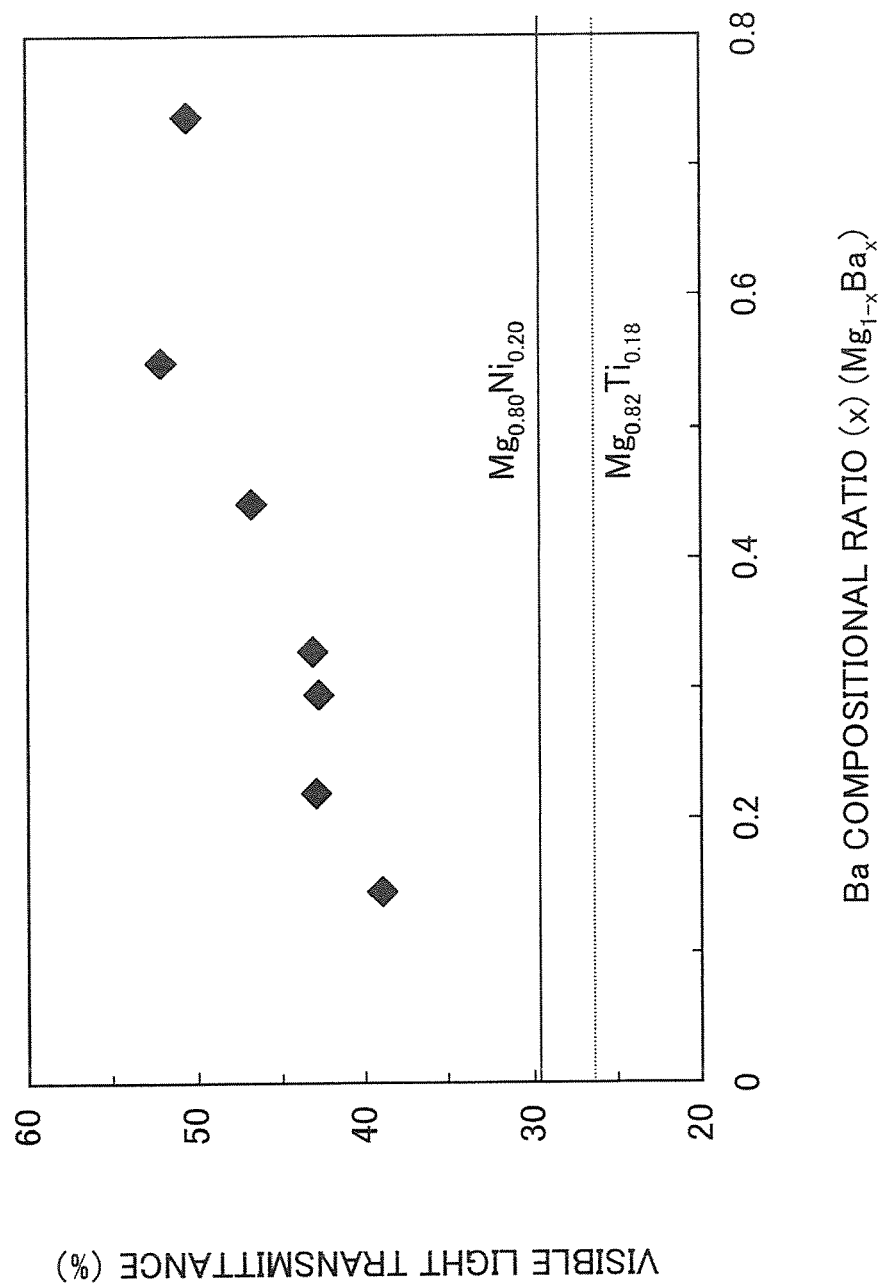
FIG. 15 shows a relationship between the visible transmittance of a switchable mirror component in the transparent state and the composition of a magnesium-barium alloy thin film.

Initially, the visible transmittance of the switchable mirror component according to Examples 21 to 27 in the transparent state was determined in the same way as in Example 2. Results are shown in FIG. 15. For comparison purposes, FIG. 15 also shows the visible transmittance (solid line) of Comparative Example 1, and the visible transmittance (broken line) of Comparative Example 2.

As seen from FIG. 15, the visible transmittance was dependent on the composition of the magnesium-barium alloy thin film. When the magnesium-barium alloy thin film had the composition $Mg_{1-x}Ba_x$ ($0.02<x<0.80$), the visible transmittance was higher than when the magnesium-nickel alloy thin film (Comparative Example 1) or the magnesium-titanium alloy thin film (Comparative Example 2) was used. When the magnesium-barium alloy thin film had the composition $Mg_{1-x}Ba_x$ ($0.20<x<0.70$), the visible transmittance was the highest.

Thereafter, the chromaticity of the transmitted light by the switchable mirror components according to Examples 21 to 27 in the transparent state was determined in the same way as in Example 2. The results are shown in FIG. 16, which also indicates, for comparison purposes, the chromaticity of transmitted light by Comparative Example 1, and the chromaticity of transmitted light by Comparative Example 2.

Figure 16:
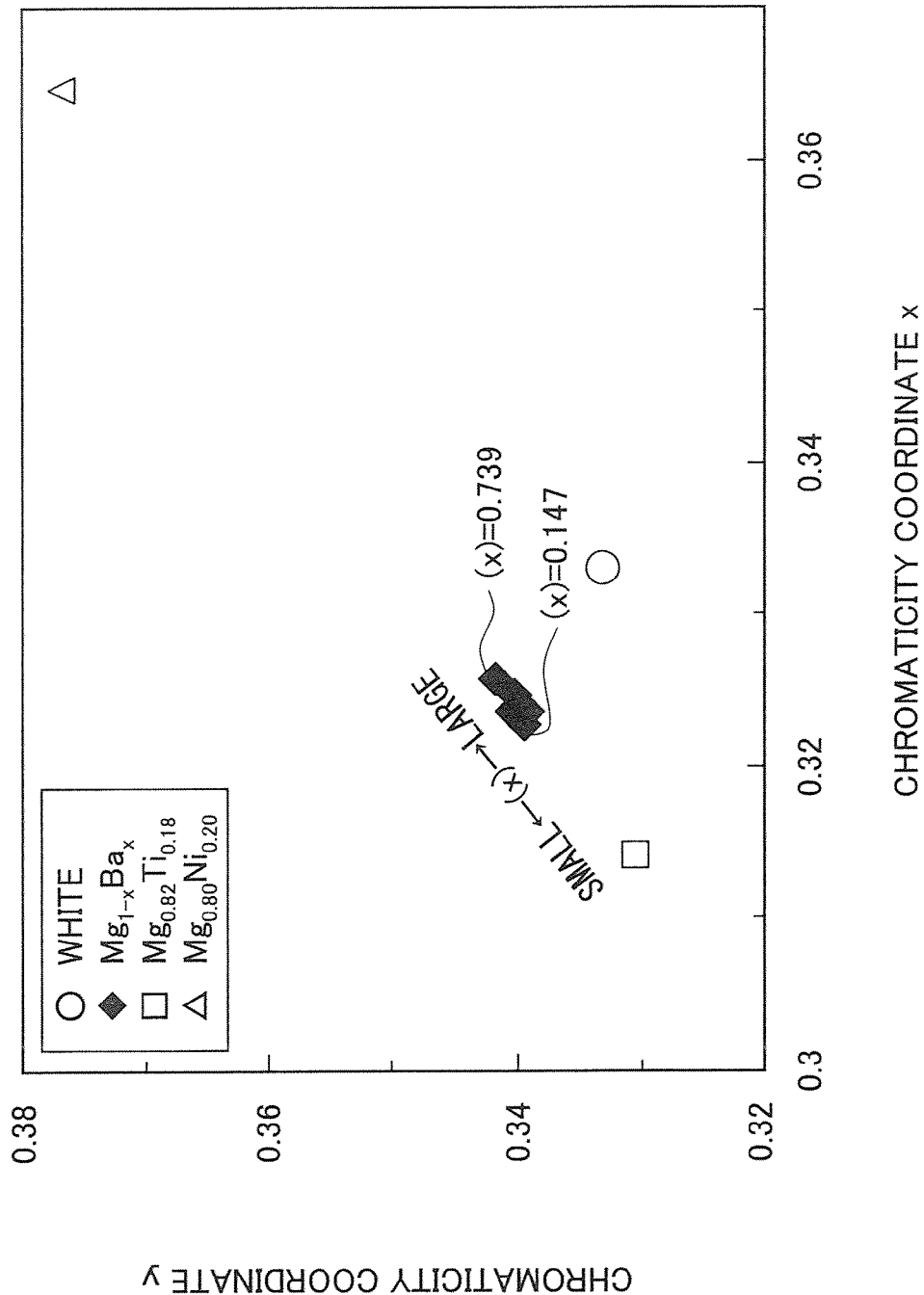
FIG. 16 shows a relationship between the chromaticity coordinates of transmitted light in a switchable mirror component in the transparent state in an XYZ color system and the composition of a magnesium-barium alloy thin film.

As seen from FIG. 16, the chromaticity coordinates of transmitted light were dependent on the composition of the magnesium-barium alloy thin film. However, the dependency was relatively small, as will be seen in comparison with FIGS. 12 and 14. When the magnesium-barium alloy thin film had the composition $Mg_{1-x}Ba_x$ (0.02<x<0.80), the color of transmitted light was white (colorless) or bluish white (cold color) which are not liable to make a user feel uncomfortable.

EXAMPLE 28 AND COMPARATIVE EXAMPLE 3

Switchable mirror components were manufactured in the same way as Example 1 with the exception that the power applied to the metallic magnesium and calcium targets during the formation of a magnesium-calcium alloy thin film was varied so that the composition of the magnesium-calcium alloy thin film was varied. Analysis of the manufactured magnesium-calcium alloy thin films of Example 28 and Comparative Example 3 by Rutherford backscattering spectroscopy showed that the composition was $Mg_{1-x}Ca_x$ (x=0.130 and 0.270, respectively).

The laser transmittance of the switchable mirror component according to Example 28 was measured. Specifically, the laser transmittance was measured by affixing to the palladium thin film 20 another glass plate 6 (thickness 1 mm) via a spacer 90, as shown in FIG. 18. A hydrogen containing gas was caused to flow through the gap between the two glass plates 4 and 6 for 30 seconds, and then the flow was stopped for five minutes. When the flow was stopped, air entered the gap between the two glass plates 4 and 6 via an opening. This cycle of control of the flow of hydrogen containing gas was repeated a predetermined number of times ("switching cycles"), during which laser transmittance was measured at one-second intervals. A semiconductor laser with a wavelength of 670 nm was used as the light source, and a silicon photodiode was used as a photoreceiving element. Measurement results are shown in FIG. 17.

Figure 17:
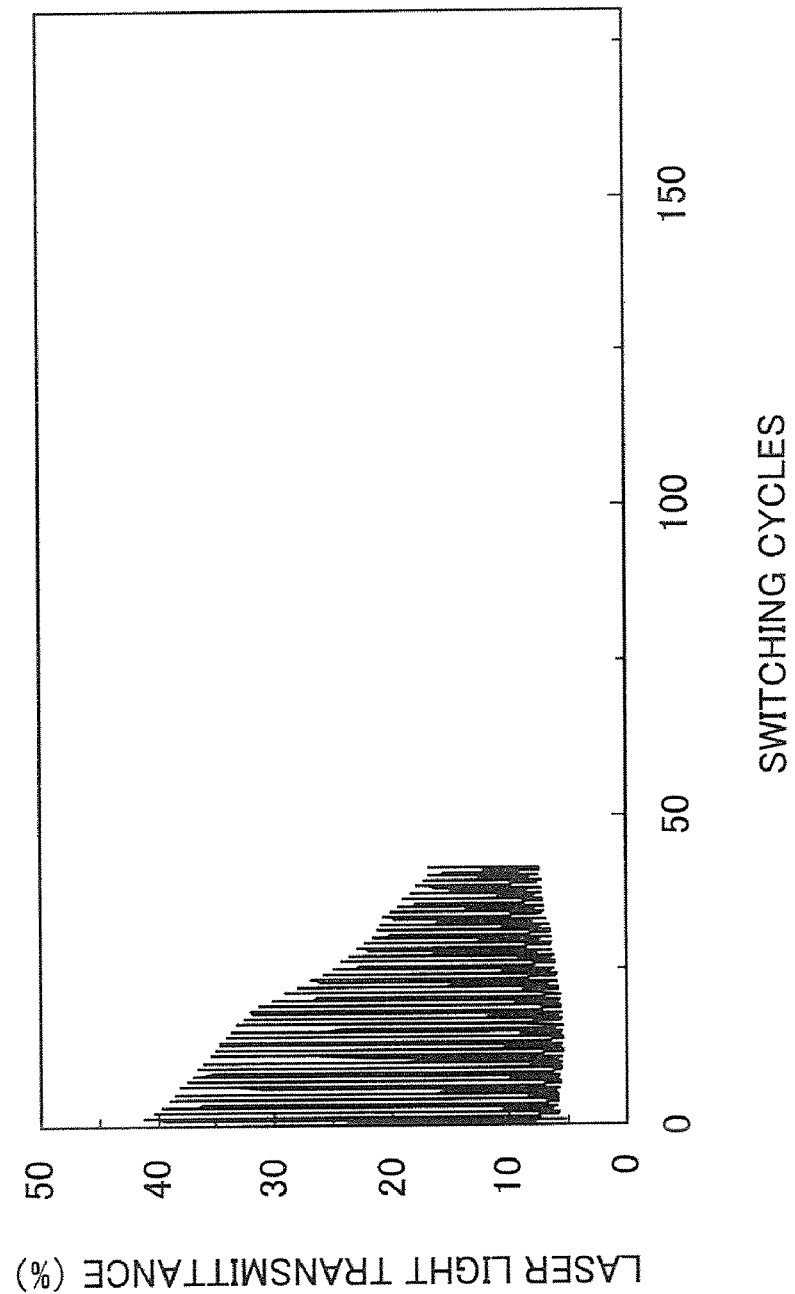
FIG. 17 shows a relationship between the switching cycles and the laser transmittance in the switchable mirror component shown in Example 28.
Figure 18:
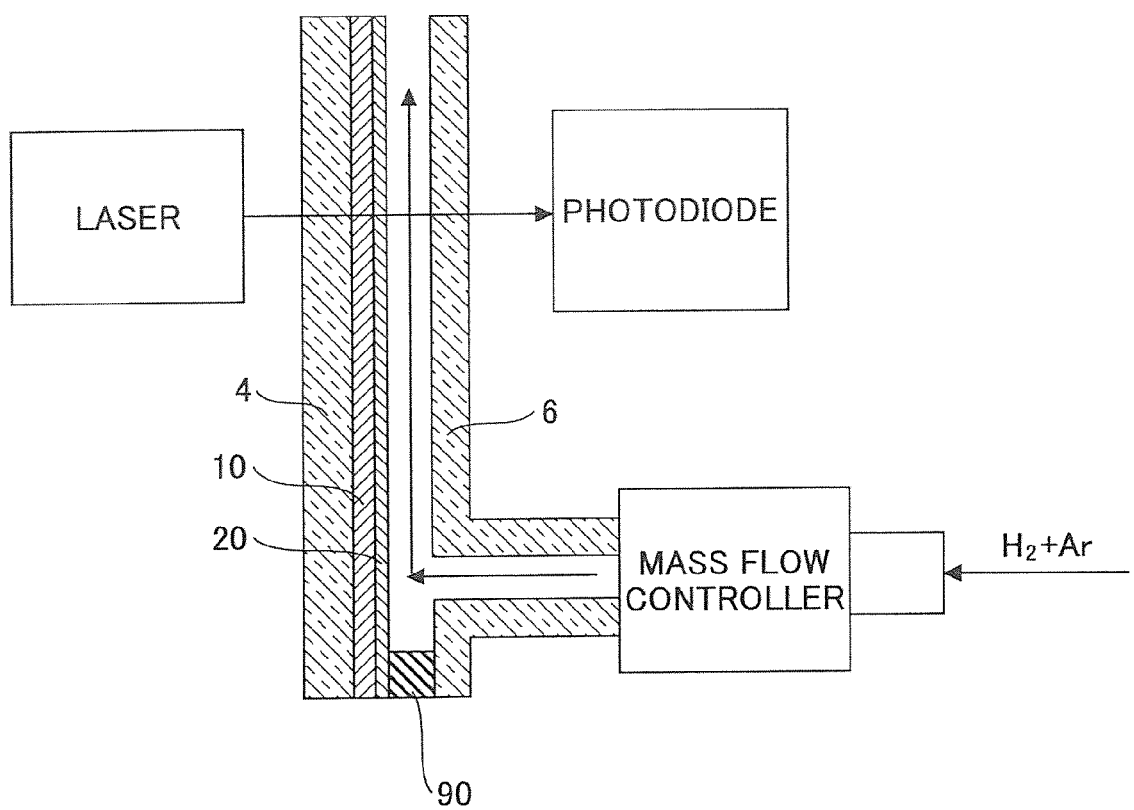
FIG. 18 shows a cross section of the switchable mirror component of FIG. 17, illustrating the arrangement of an apparatus used for measuring the laser transmittance.

As seen from FIG. 17, the difference in the laser transmittance between the transparent state and the mirror state became smaller as the switching cycles increased. The "switching cycles" herein is intended to refer to the number of times that the state of the switchable mirror component changed from the mirror state to the transparent state and back to the mirror state. The "mirror state" is present immediately before the start of the flow of hydrogen containing gas. The "transparent state" is present immediately before stopping the flow of hydrogen containing gas. The maximum number of times that the difference of 10% or more was maintained in the laser transmittance between the transparent state and the mirror state (hereafter referred to as "the endurance switching cycles") was 39.

Figure 19:
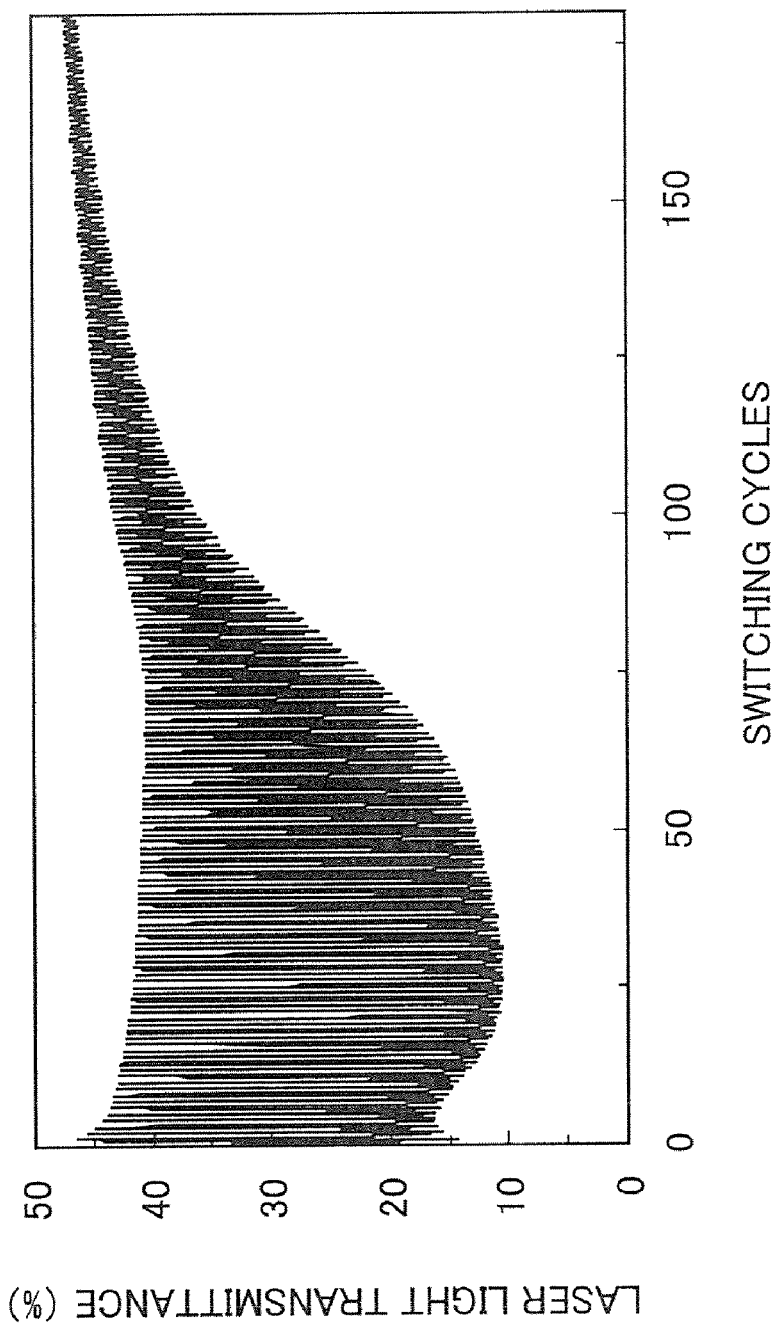
FIG. 19 shows a relationship between the switching cycles and the laser transmittance of the switchable mirror component according to Comparative Example 3.

The laser transmittance of the switchable mirror component according to Comparative Example 3 was measured in the same way as in Example 28. Measurement results are shown in FIG. 19. As seen from FIG. 19, the endurance switching cycles was 92. As will also be seen by comparing FIGS. 19 and 17, when the magnesium-calcium alloy thin film was used, the endurance switching cycles tended to increase as the Ca compositional ratio x increased. However, in the case of the switchable mirror component according to Comparative Example 3, the color of transmitted light in the transparent state was yellow because the Ca compositional ratio x was too large.

EXAMPLE 29

A switchable mirror component was manufactured in the same way as Example 12, with the exception that the power applied to the metallic magnesium and strontium targets was varied during the formation of a magnesium-strontium alloy thin film so that the composition of the magnesium-strontium alloy thin film was changed. Analysis of the manufactured magnesium-strontium alloy thin film by Rutherford backscattering spectroscopy indicated the composition $Mg_{1-x}Sr_x$ (x=0.170).

Figure 20:
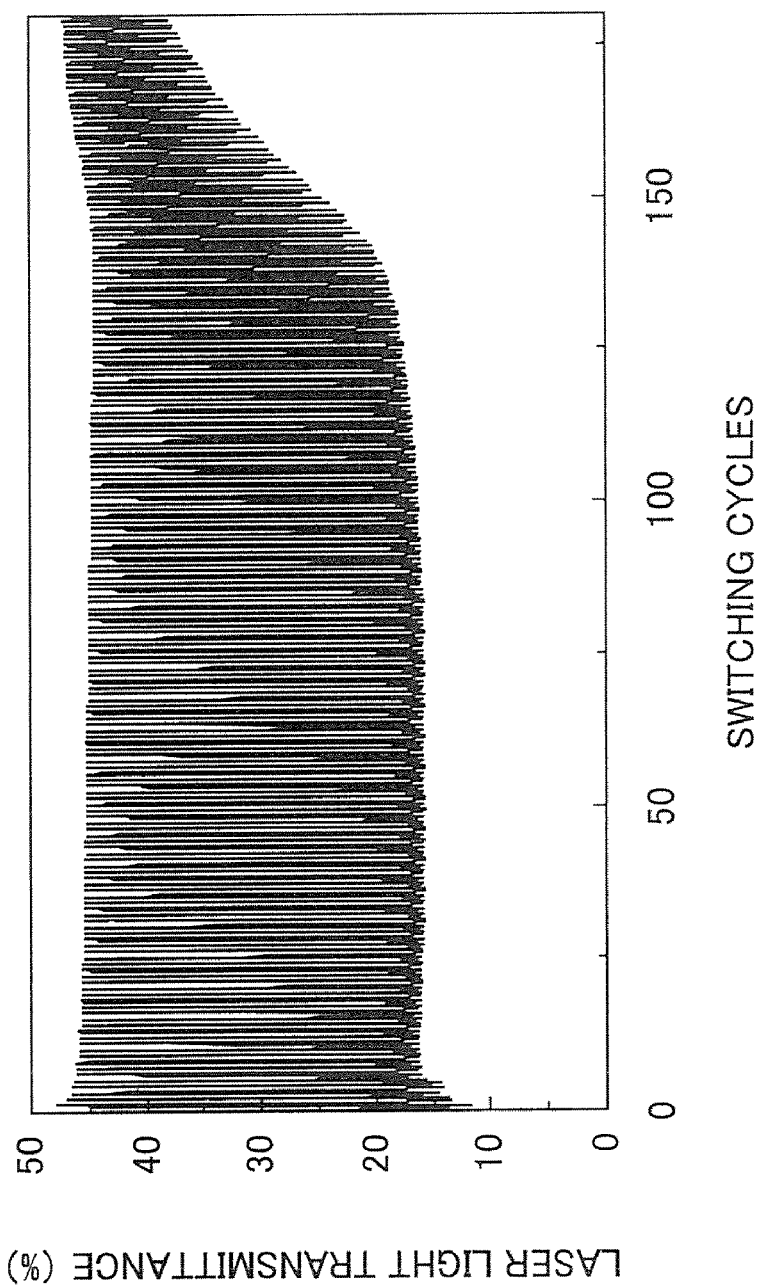
FIG. 20 shows a relationship between the switching cycles and the laser transmittance of the switchable mirror component shown in Example 29.

The laser transmittance of switchable mirror component according to Example 29 was measured in the same way as in Example 28. Measurement results are shown in FIG. 20. As seen from FIG. 20, the endurance switching cycles was 176. As will also be seen by comparing FIGS. 20 and 19, when the magnesium-strontium alloy thin film was used, better endurance to switching was obtained than when the magnesium-calcium alloy thin film was used. In the case of the switchable mirror component according to Example 29, the color of transmitted light in the transparent state was white (colorless) because the Sr compositional ratio x in the magnesium-strontium alloy thin film was in an appropriate range.

EXAMPLE 30

A switchable mirror component was manufactured in the same way as Example 21 with the exception that, when forming the magnesium-barium alloy thin film, the power applied to the metallic magnesium and barium targets was varied so that the composition of the magnesium-barium alloy thin film was changed. Analysis of the manufactured magnesium-barium alloy thin film by Rutherford backscattering spectroscopy indicated the composition $Mg_{1-x}Ba_x$ (x=0.300).

Figure 21:
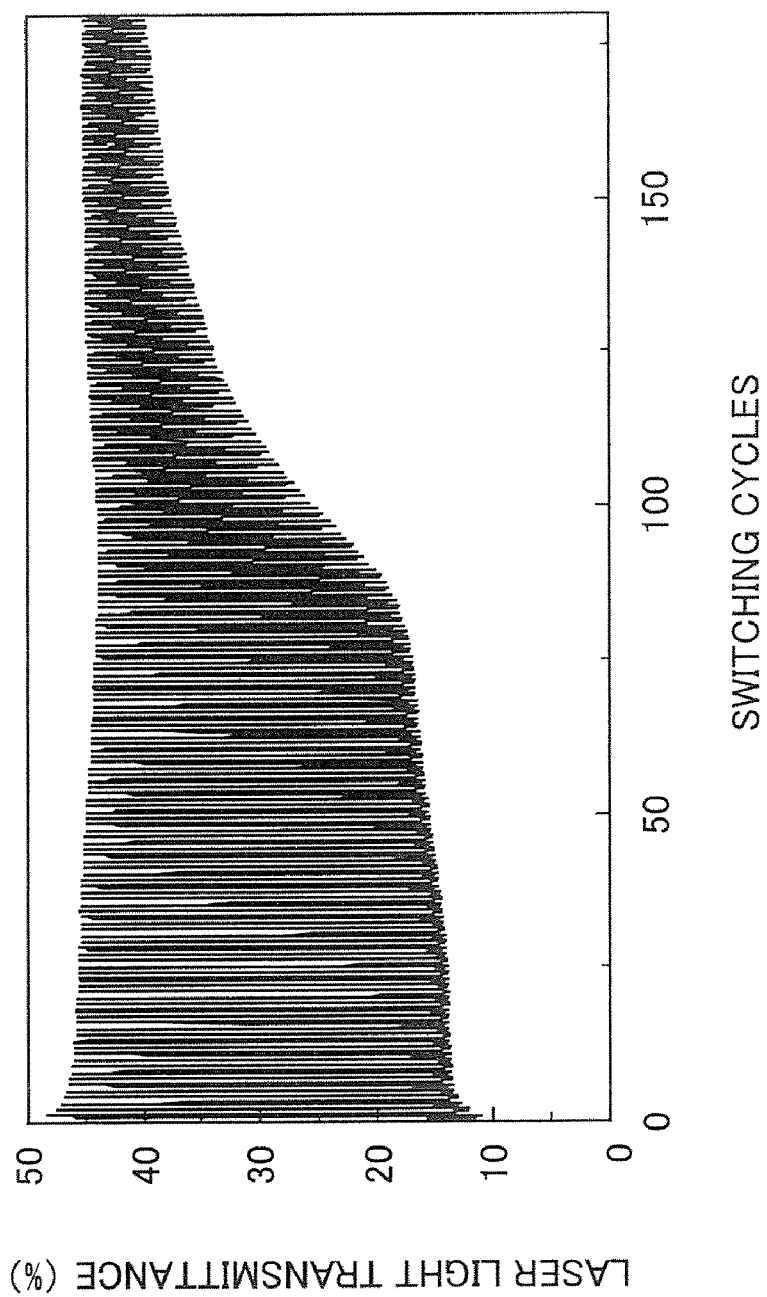
FIG. 21 shows a relationship between the switching cycles and the laser transmittance of the switchable mirror component shown in Example 30.

The laser transmittance of the switchable mirror component according to Example 30 was measured in the same way as in Example 28. Measurement results are shown in FIG. 21. As seen from FIG. 21, the endurance switching cycles was 131. As will also be seen by comparing FIGS. 21 and 19, when the magnesium-barium alloy thin film was used, better endurance to switching was obtained than when the magnesium-calcium alloy thin film was used. In Example 30, the color of transmitted light was white (colorless) in the transparent state because the Ba compositional ratio x in the magnesium-barium alloy thin film was in an appropriate range.

EXAMPLE 31

A switchable mirror component was manufactured in the same way as in Example 1 with the exception that, instead of the magnesium-calcium alloy thin film, a magnesium-calcium-strontium-barium alloy thin film was formed as the switchable layer 10. Specifically, metallic magnesium, metallic calcium, metallic strontium, metallic barium, and metallic palladium were set on five sputter guns, respectively, as targets. Analysis of the manufactured magnesium-calcium-strontium-barium alloy thin film by Rutherford backscattering spectroscopy indicated the composition $Mg_{1-x-y-z}Ca_xSr_yBa_z$ (x=0.050, y=0.070, z=0.130).

Figure 22:
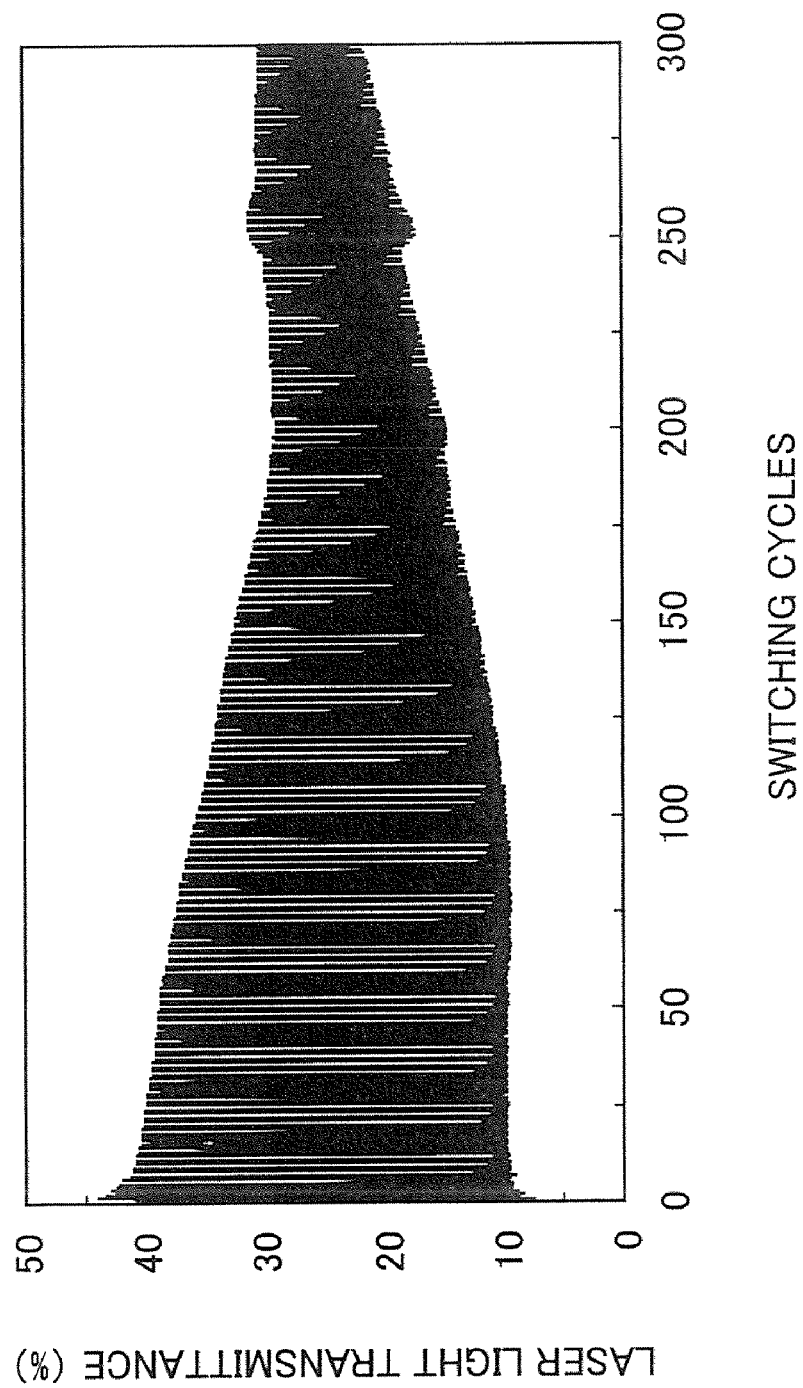
FIG. 22 shows a relationship between the switching cycles and the laser transmittance of the switchable mirror component shown in Example 31.

The laser transmittance of the switchable mirror component according to Example 31 was measured in the same way as in Example 28. Measurement results are shown in FIG. 22. As seen from FIG. 22, the endurance switching cycles was 285. As will also be appreciated by comparing FIG. 22 and FIGS. 19 to 21, when the magnesium-calcium-strontium-barium alloy thin film was used, better endurance to switching was obtained than when a two-component type alloy thin film was used. In Example 31, the color of transmitted light in the transparent state was white (colorless).

EXAMPLES 32 to 34

Switchable mirror components were manufactured in the same way as Example 1 with the exception that, when forming the magnesium-calcium alloy thin film, the power applied to the metallic magnesium and calcium targets was varied so that the composition of the magnesium-calcium alloy thin film was varied. Analysis of the manufactured magnesium-calcium alloy thin films of Examples 32 to 34 by Rutherford backscattering spectroscopy indicated the composition $Mg_{1-x}Ca_x$ (x=0.040, 0.062, and 0.077, respectively).

The switching response of the switchable mirror components according to Examples 32 to 34 was measured by affixing to the palladium thin film 20 another glass plate (thickness 1 mm) 6 via a spacer, as shown in FIG. 18. Flow of a hydrogen containing gas through the gap between the two glass plates 4 and 6 was started 10 seconds after the start of measurement, and then the flow was stopped 60 seconds later. When the flow of hydrogen containing gas was stopped, air entered the gap between the glass plates 4 and 6 via an opening. The atmosphere in the gap between the glass plates 4 and 6 was thus controlled. The results are shown in FIG. 23.

Figure 23:
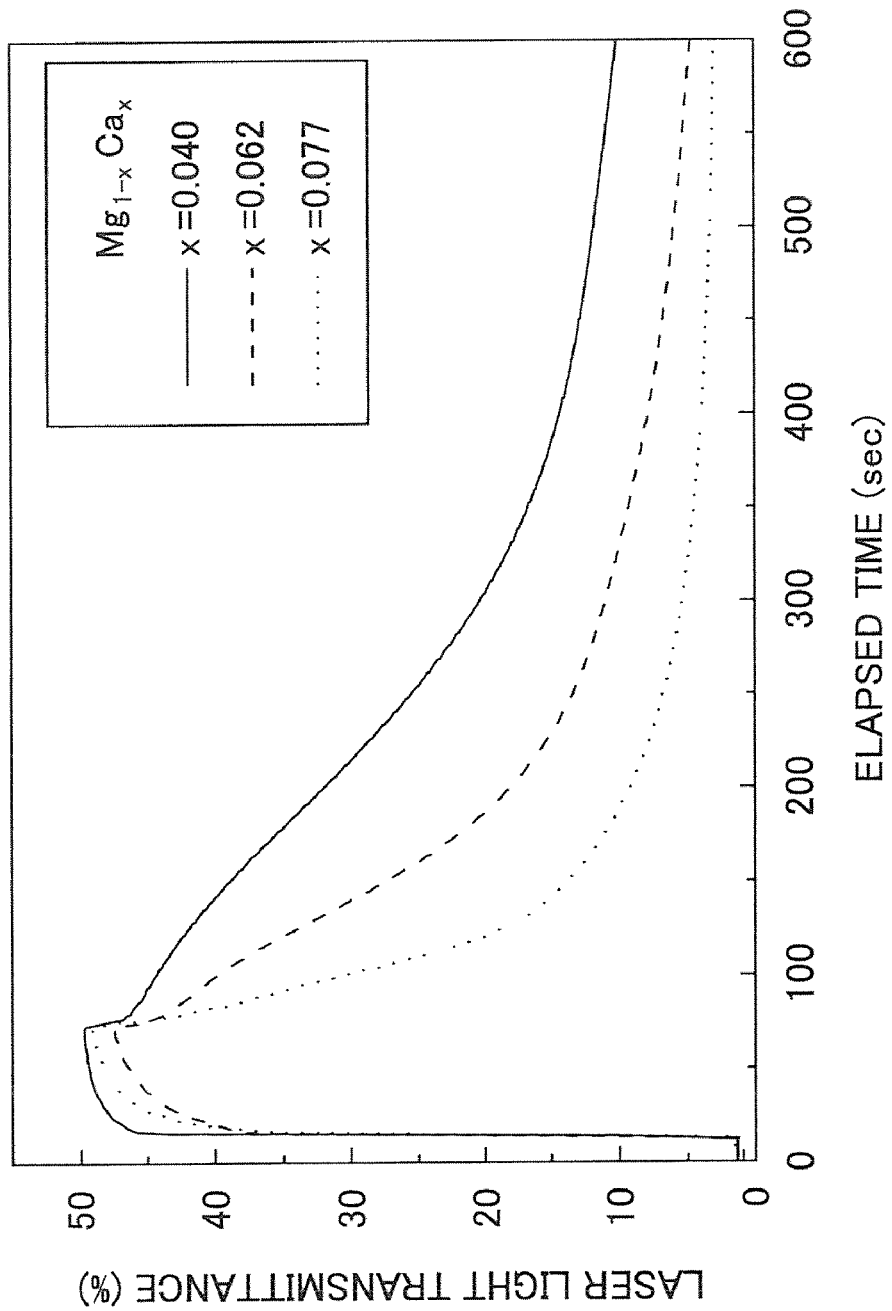
FIG. 23 shows a relationship between the switching response of a switchable mirror component and the composition of the magnesium-calcium alloy thin film.

As seen from FIG. 23, the switching response from the mirror state to the transparent state was not dependent on the composition of the magnesium-calcium alloy thin film. The speed of switching from the mirror state to the transparent state was higher than the speed of switching from the transparent state to the mirror state.

On the other hand, the switching response from the transparent state to the mirror state was dependent on the composition of the magnesium-calcium alloy thin film. Specifically, as the Ca compositional ratio x increased, the switching speed tended to increase. While not shown in the drawings, in the case of a magnesium thin film manufactured in the same way as Example 2 but that did not contain calcium, the switching speed was very low, so that the state returned to the mirror state in two hours.

EXAMPLE 35

The insulating glass shown in FIG. 9, which is based on the electrochromic method, was manufactured. Specifically, a switchable mirror component was manufactured in the same way as in Example 1 with the exception that, when forming the magnesium-calcium alloy thin film, the power applied to the metallic magnesium and calcium targets was varied so that the composition of the magnesium-calcium alloy thin film was varied. Analysis of the manufactured magnesium-calcium alloy thin film by Rutherford backscattering spectroscopy indicated the composition $Mg_{1-x}Ca_x$ (x=0.075).

In this way, there were formed on one glass substrate with thickness 1 mm the magnesium-calcium alloy thin film ($Mg_{1-x}Ca_x$ (x=0.075)) with a thickness 48 nm, and then a palladium film with a thickness 5 nm. Then, there was formed on another glass substrate with a thickness 1 mm an ITO film with a thickness 200 nm by sputtering. Finally, an electrolyte (aqueous sodium hydroxide) was hermetically contained between the palladium film on the one glass plate and the ITO film on the other glass plate, thereby manufacturing an electrochromically insulating glass.

FIGS. 24A and 24B shows photographs of the insulating glass according to Example 35, indicating the mirror state (FIG. 24A) and the transparent state (FIG. 24B). When a voltage of minus 3V was applied to the magnesium-calcium alloy thin film, the mirror state changed to the transparent state. When a voltage of 1V was applied to the magnesium-calcium alloy thin film, the transparent state switched back to the mirror state.

Although this invention has been described in detail with reference to certain embodiments, variations and modifications exist within the scope and spirit of the invention as described and defined in the following claims.

The present application is based on the Japanese Priority Applications No. 2008-207915 filed Aug. 12, 2008 and No. 2009-121889 filed May 20, 2009, the entire contents of which are hereby incorporated by reference.

What is claimed is:

1. A switchable mirror element comprising:
   a switchable layer having a chromic property enabling the switchable layer to be reversibly changed between a transparent state by hydrogenation and a mirror state by dehydrogenation; and
   a catalytic layer disposed on the switchable layer and configured to promote hydrogenation or dehydrogenation in the switchable layer,
   wherein the switchable layer includes an alloy of one or more metals from calcium, strontium, and barium, and magnesium.

2. The switchable mirror element according to claim 1, wherein the switchable layer has a composition $Mg_{1-x}Ca_x$ and wherein $0.02<x<0.20$.

3. The switchable mirror element according to claim 1, wherein the switchable layer has a composition $Mg_{1-x}Sr_x$ and wherein $0.02<x<0.50$.

4. The switchable mirror element according to claim 1, wherein the switchable layer has a composition $Mg_{1-x}Ba_x$ and wherein $0.02<x<0.80$.

5. The switchable mirror element according to claim 1, wherein the catalytic layer includes palladium, platinum, a palladium alloy, or a platinum alloy.

6. The switchable mirror element according to claim 1, comprising a protection layer disposed on the catalytic layer on an opposite side to the switchable layer, the protection layer having a hydrogen permeability and water repellency.

7. The switchable mirror element according to claim 1, comprising:
   a transparent electrode disposed on an opposite side to the switchable layer with respect to the catalytic layer; and
   an electrolyte hermetically contained between the catalytic layer and the transparent electrode.

8. The switchable mirror element according to claim 7, comprising a protection layer disposed between the catalytic layer and the electrolyte, the protection layer having hydrogen permeability and water repellency.

9. An insulating glass comprising:
   two glass plates; and
   the switchable mirror element according to claim 7 disposed between the two glass plates.

10. The switchable mirror element according to claim 1, wherein the switchable layer has a film thickness in a range of from 10 nm to 200 nm.

11. The switchable mirror element according to claim 1, wherein the catalytic layer has a film thickness in a range of from 1 nm to 10 nm.

12. A switchable mirror component comprising:
the switchable mirror element according to claim 1; and
a transparent member disposed on the switchable layer on an opposite side to the catalytic layer.

13. The switchable mirror component according to claim 12, wherein the transparent member is made of a glass or plastic material.

14. An insulating glass comprising:
two glass plates; and
the switchable mirror element according to claim 1 disposed on an inner surface of one of the two glass plates.

15. The insulating glass according to claim 14, comprising an atmosphere controller configured to charge or discharge hydrogen or oxygen into or from a gap between the two glass plates.

* * * * *